(12) United States Patent
Chen

(10) Patent No.: US 9,060,602 B2
(45) Date of Patent: Jun. 23, 2015

(54) FURNITURE ASSEMBLY

(71) Applicant: Protrend Co., Ltd., Taipei (TW)

(72) Inventor: Shun-Yi Chen, Taipei (TW)

(73) Assignee: PROTREND CO., LTD., Taipei (TW)

( * ) Notice: Subject to any disclaimer, the term of this patent is extended or adjusted under 35 U.S.C. 154(b) by 0 days.

(21) Appl. No.: 14/141,970

(22) Filed: Dec. 27, 2013

(65) Prior Publication Data

US 2015/0145394 A1  May 28, 2015

(30) Foreign Application Priority Data

Nov. 22, 2013  (TW) .............................. 102142587 A

(51) Int. Cl.
| | | |
|---|---|---|
| F16B 12/00 | (2006.01) | |
| A47B 47/00 | (2006.01) | |
| F16B 12/02 | (2006.01) | |
| A47B 96/14 | (2006.01) | |

(52) U.S. Cl.
CPC ......... *A47B 47/0041* (2013.01); *A47B 47/0016* (2013.01); *A47B 96/14* (2013.01); *A47B 47/0008* (2013.01); *F16B 12/02* (2013.01)

(58) Field of Classification Search
CPC .... A47B 47/00; A47B 47/002; A47B 7/0041; A47B 47/0008; A47B 47/0016; A47B 96/14; A47B 7/0033; A47B 47/005; A47B 87/02; Y10T 403/7094; F16B 12/02

USPC .......... 312/265.5, 108, 107, 111, 265.4, 263, 312/140, 257.1, 265.2, 265.3; 211/194, 211/188; 403/DIG. 10, DIG. 11, DIG. 12, 403/DIG. 13

See application file for complete search history.

(56) References Cited

U.S. PATENT DOCUMENTS

| | | | | |
|---|---|---|---|---|
| 3,229,334 | A * | 1/1966 | Thome | 403/173 |
| 3,547,472 | A * | 12/1970 | Ehrman | 403/381 |
| 3,830,030 | A * | 8/1974 | Yoshida | 52/584.1 |
| 4,610,561 | A * | 9/1986 | Cecchellero et al. | 403/171 |
| 5,466,057 | A * | 11/1995 | Blankenburg | 312/108 |
| 5,525,005 | A * | 6/1996 | Chen | 403/374.4 |
| 5,813,738 | A * | 9/1998 | Cheng | 312/263 |
| 6,952,905 | B2 * | 10/2005 | Nickel et al. | 52/711 |
| 7,431,409 | B2 * | 10/2008 | Yang | 312/265.5 |
| 7,918,515 | B2 * | 4/2011 | Wang | 312/108 |
| 2004/0148897 | A1 * | 8/2004 | Nickel et al. | 52/578 |
| 2007/0132345 | A1 * | 6/2007 | Lai | 312/265.4 |
| 2013/0068762 | A1 * | 3/2013 | Ma | 220/4.27 |
| 2013/0101342 | A1 * | 4/2013 | Bernardin | 403/292 |

* cited by examiner

*Primary Examiner* — Daniel J Troy
*Assistant Examiner* — Hiwot Tefera
(74) *Attorney, Agent, or Firm* — WPAT, PC; Justin King

(57) ABSTRACT

A furniture assembly includes at least four division plates, at least four squared beams, and at least one storage space. The division plate has a left lateral surface and a right lateral surface to respectively mount a front fastener and a rear fastener. Four division plates are adhered to the squared beam at four orthogonal directions. The front fastener and the rear fastener of the division plate are to penetrate respective anchorage holes at the squared beam. With end plugs to be inserted into the corresponding end opening of the squared beam, the end plug and the corresponding fasteners of the division plates can be buckled up firmly at the corresponding end of the squared beam.

15 Claims, 11 Drawing Sheets

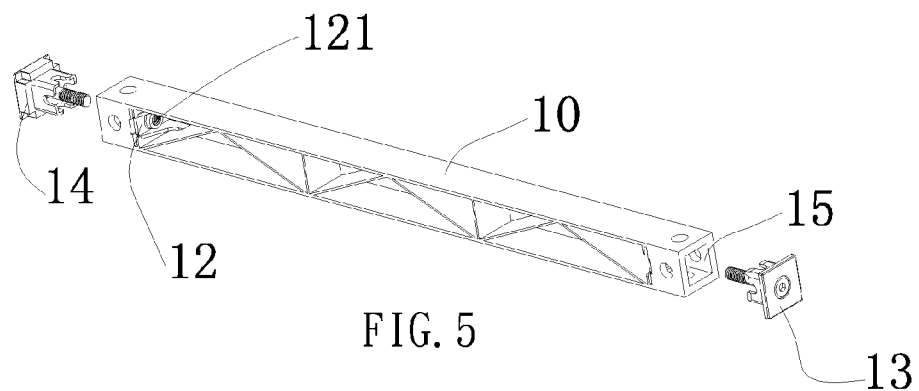
FIG. 5
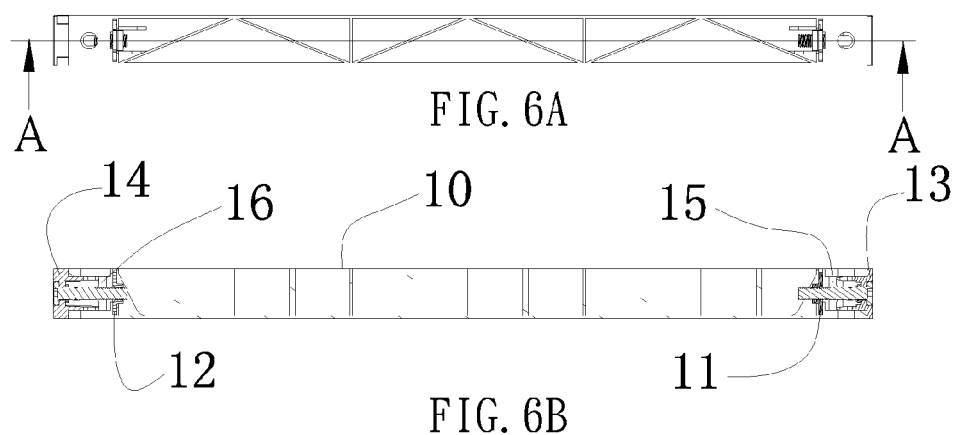
FIG. 6A
FIG. 6B
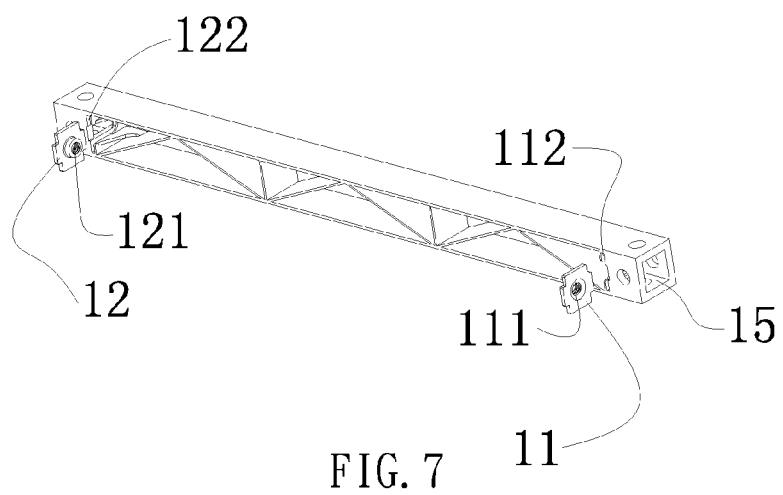
FIG. 7

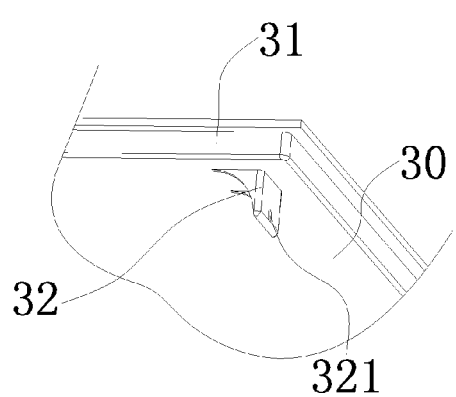
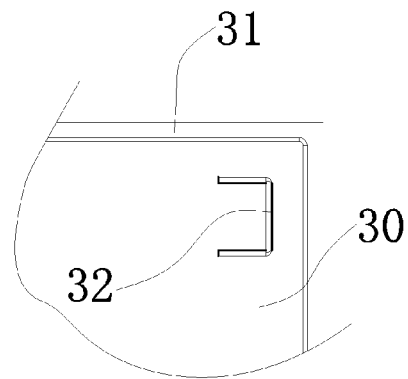
FIG. 13A  FIG. 13B
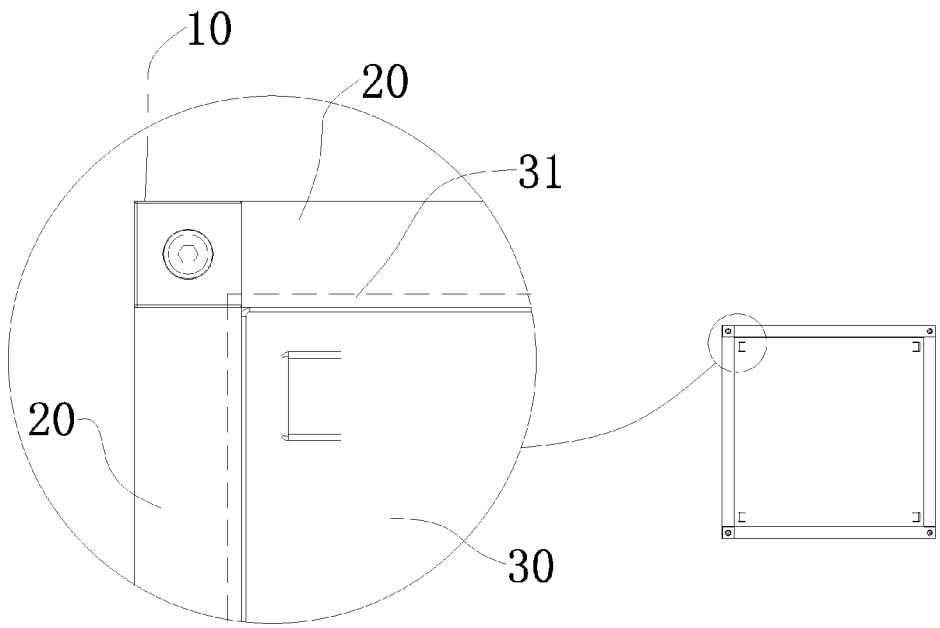
FIG. 14B  FIG. 14A

FURNITURE ASSEMBLY

This application claims the benefit of Taiwan Patent Application Serial No. 102142587, filed Nov. 22, 2013, the subject matter of which is incorporated herein by reference.

BACKGROUND OF INVENTION

1. Field of the Invention

The invention relates to a furniture structure, and more particularly to a furniture assembly that introduces a plurality of squared beams to assemble division plates horizontally and vertically in perpendicular directions so as to provide variety designs of system cupboards with various shapes and sizes.

2. Description of the Prior Art

In ordinary houses and/or office, a cupboard is usually seen for a storage purpose. In the case that the cupboard is hard to be assembled/disassembled, the difficulty in displacing would become troublesome. Currently, in the market, system furniture that can be made to any suitable size and shape is found and becomes popular. Parts for assembling such system furniture have been standardized so as to meet a mass production need and a cost-down purpose. Consequently, such type of furniture is easy to be disassembled/assembled and suitable to those who move frequently.

Furniture in the marketplace is usually provided as a fixed and fastened piece integrating upright plates and horizontal plates. Such furniture can seldom provide satisfied structure strength. Sometimes, a tiny forcing may destroy the cupboard, typical furniture with plates, or at least shake the cupboard. In the art, though the cupboard can be assembled/disassembled any time, yet such an assembly or disassembly is usually not an easy task, but needs an experienced worker to complete the job.

SUMMARY OF THE INVENTION

Accordingly, it is the primary object of the present invention to provide a furniture assembly that introduces squared beams capable of engaging division plates in all four orthogonal directions, i.e. the upward, downward, leftward, and rightward directions, so as to construct a system cupboard with an extendable size.

In the present invention, the furniture assembly, embodied as a system cupboard, includes at least four division plates, at least four squared beams, and at least one storage space. The division plate has a left lateral surface and a right lateral surface to respectively build a front fastener and a rear fastener. Inside the squared beam, a front end plate and a rear end plate are included. Each of the front end plate and the rear end plate has a screw hole located at the respective center thereof for engaging a corresponding end plug (a front end plug and a rear end plug, respectively). The front end plug is to seal an opening at a front end of the squared beam, while the rear end plug is to seal another opening at an opposing rear end thereof. A front receiving room is defined for a nest space between the opening at the front end and the front end plate of the squared beam. The front receiving room includes four surrounding anchorage holes thereof at an upper wall, a lower wall, a left-side wall and a right-side wall, each of which is to engage, in a penetration way, the front fastener of the respective division plate. Similarly, a rear receiving room is defined for another nest space between the opening at the rear end and the rear end plate of the squared beam. The rear receiving room includes also four surrounding anchorage holes thereof at its own upper, lower, left-side and right-side walls, each of which is to engage, in a penetration way, the rear fastener of the respective division plate. On the other hand, each of the front end plug and the rear end plug has symmetrically four U-shape guides located respectively for engaging, in a tight-engagement manner with the squared beam, the front fastener or the rear fastener of the corresponding division plate.

In the present invention, the at least four division plates and the at least four squared beams is to form a storage space. A back plate is further included to seal a rear opening of the storage space. The back plate has four L-shape positioning brackets located interiorly at four corresponding corners thereof for contacting against the respective division plates. The rear end plug has a rear cover plate further having symmetrically four rear corner cavities for matching corresponding corners of the back plate. Upon such an arrangement of the rear cover plate to position the corresponding corner of the back plate, the back plate is then firmly established to seal the storage space.

The storage space can further have a left sub-division plate and an opposing right sub-division plate to respectively adhere to the corresponding division plates forming the storage space so as to build corresponding drawer rails for a drawer and pivotal parts for a door plate.

Each of the L-shape positioning brackets on the inside surface of the back plate further includes a protrusion bracket parallel to the division plates located laterally to the storage space. The spacing between the protrusion bracket and the division plate at either side is a spacing providing the left sub-division plate or the right sub-division plate to slide through for a positioning purpose. In addition, by having the positioning pin to penetrate the corresponding anchorage hole on each protrusion bracket and the respective pin hole on the left sub-division plate or the right sub-division plate, so as to prevent the left sub-division plate and the right sub-division plate from possible displacement. A spacer bar is further included to space the left sub-division plate from the right sub-division plate by locating across upper front edges of the left sub-division plate and the right sub-division plate.

All these objects are achieved by the furniture assembly described below.

BRIEF DESCRIPTION OF THE DRAWINGS

The present invention will now be specified with reference to its preferred embodiment illustrated in the drawings, in which:

FIG. 5 shows separately an squared beam and two end plugs for the furniture assembly in accordance with the present invention;

FIG. 6A is a front view of the squared beam and two end plugs in the engagement state of FIG. 5;

FIG. 6B is a cross-sectional view of FIG. 6A along line A-A;

FIG. 7 is a perspective view of the squared beam of FIG. 5, but with two end plates separated;

FIG. 13A shows a portion of the back plate for the furniture assembly in accordance with the present invention;

FIG. 13B is a bottom view of FIG. 13A;

FIG. 14A is a planar view of the back plate installed to a unit of the furniture assembly in accordance with the present invention, viewing from the open end of the storage space;

FIG. 14B is an enlarged view of a circled portion of FIG. 14A;

DESCRIPTION OF THE PREFERRED EMBODIMENT

The invention disclosed herein is directed to a furniture assembly. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

Figure 1:
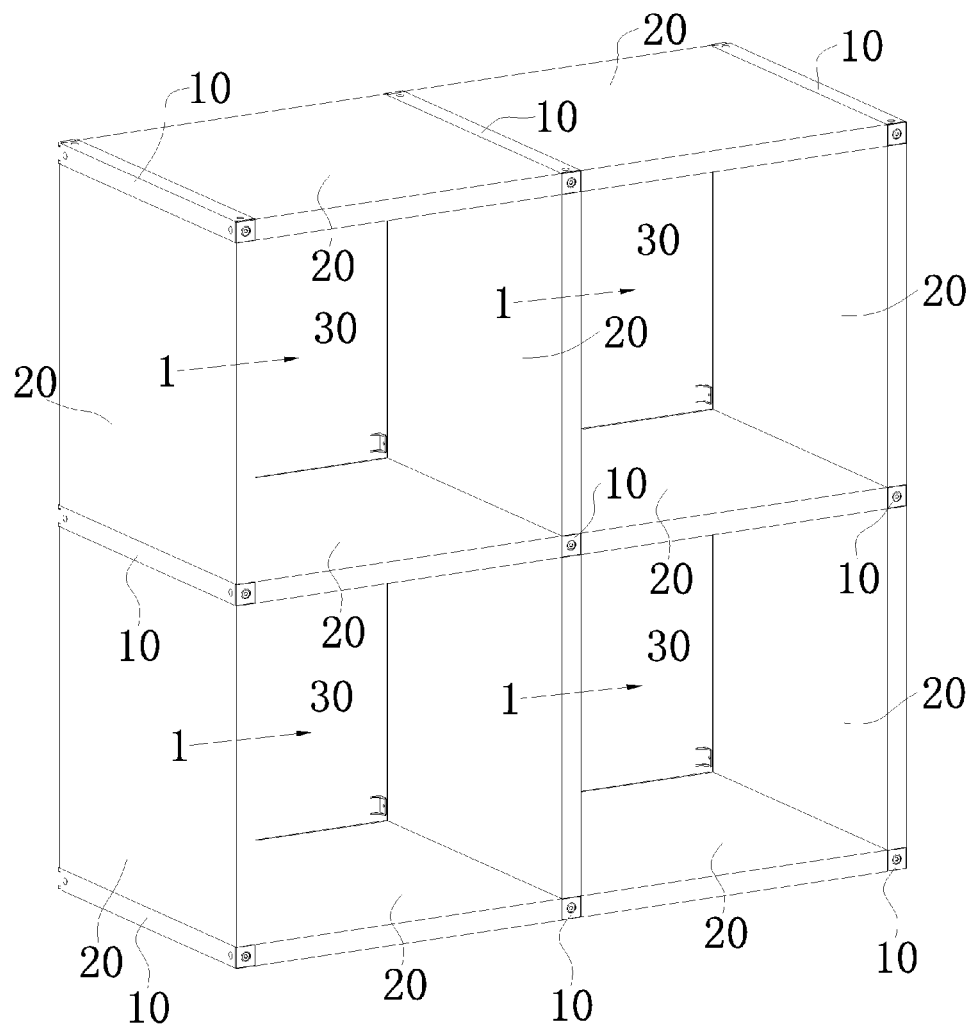
FIG. 1 is a perspective view of an embodiment of the furniture assembly in accordance with the present invention.

Referring now to FIG. 1, a typical embodiment (as a cupboard) of the furniture assembly in accordance with the present invention is shown. In this embodiment, the cupboard includes nine squared beams 10, twelve division plates 20 and four back plates 30. Namely, the cupboard as shown includes four storage spaces 1. A unit of the storage space 1 is formed by four squared beams 10 located to four corners of the unit and four division plates 20, each of the division plates 20 is located between two squared beams 10.

Figure 2:
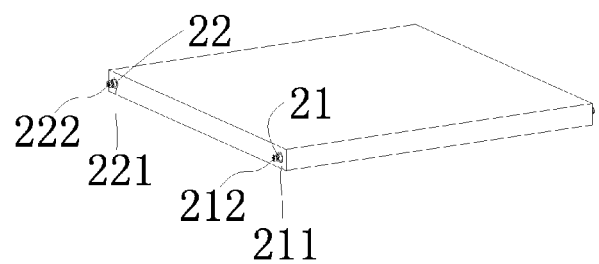
FIG. 2 shows one of the division plates of FIG. 1.
Figure 3:
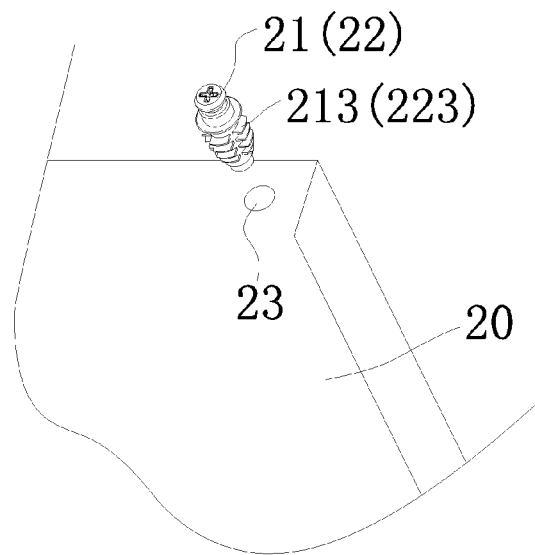
FIG. 3 is a perspective view of a fastener and a portion of the division plate for the furniture assembly in accordance with the present invention.
Figure 4:
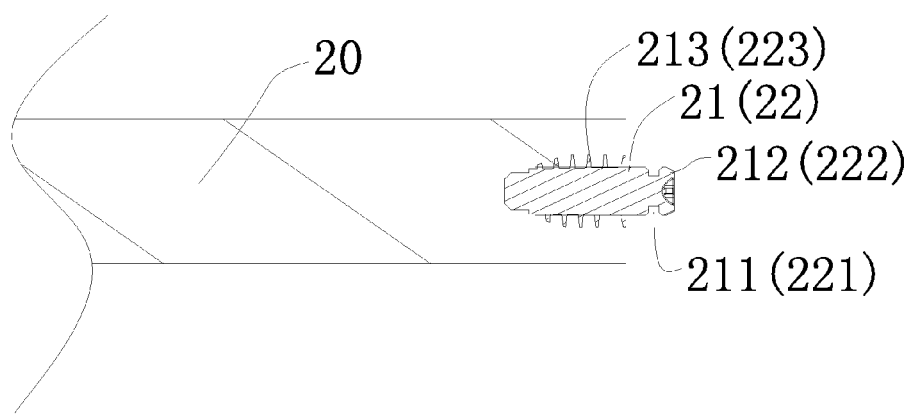
FIG. 4 is a cross-sectional view showing the engagement of the fastener and the division plate for the furniture assembly in accordance with the present invention.
Figure 8:
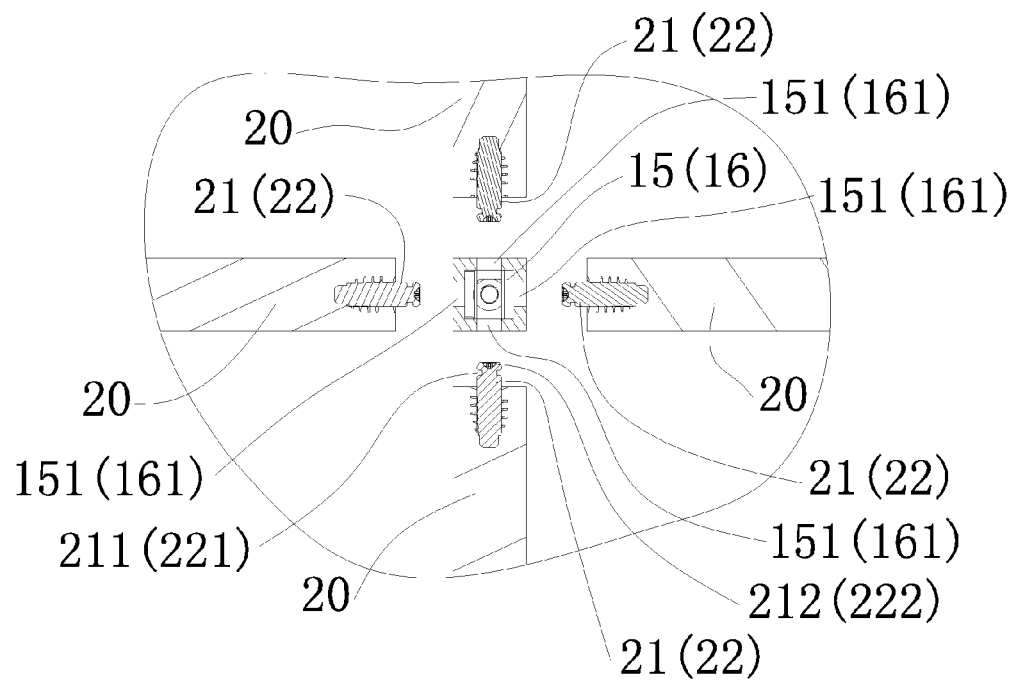
FIG. 8 shows schematically a separate view of the squared beam and four division plates to be assembled together for the furniture assembly in accordance with the present invention.
Figures 9A, 9B, 9C:
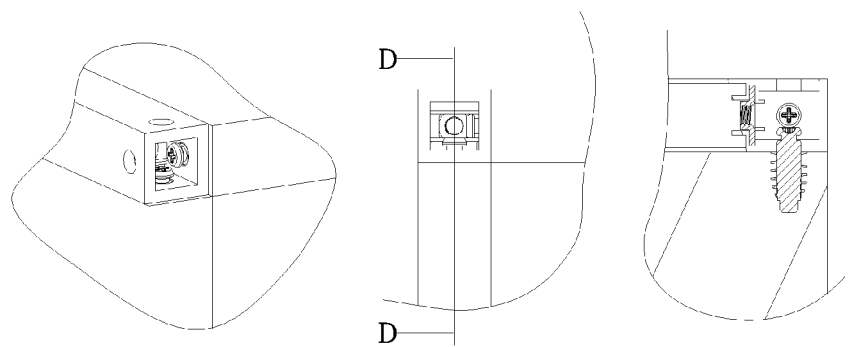
FIG. 9A shows a perspective view of the squared beam engaging two division plates for the furniture assembly in accordance with the present invention, in a state that the end plug is removed.
FIG. 9B is a front view of FIG. 9A.
FIG. 9C is a cross-sectional view of FIG. 9B along line D-D.
Figures 10A, 10B:
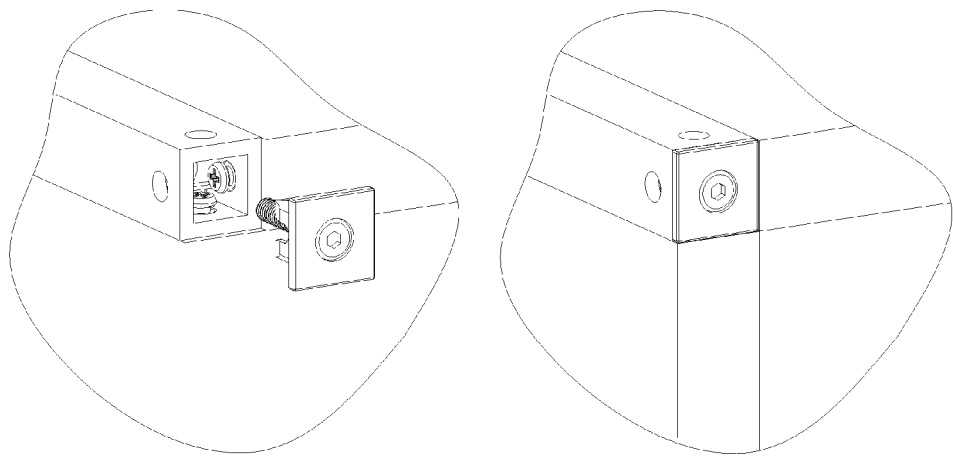
FIG. 10A is a perspective view of FIG. 9A with the end plug in position.
FIG. 10B is an exploded view of FIG. 10A.
Figures 10C, 10D:
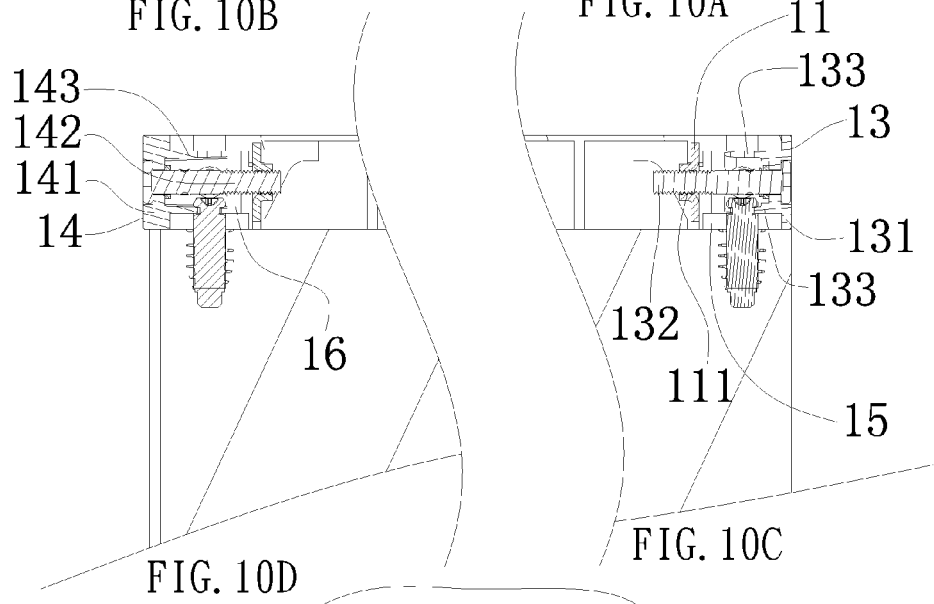
FIG. 10C is a cross-sectional view of FIG. 10A, viewing from a left-hand side thereof.
FIG. 10D is another cross-sectional view of FIG. 10A, viewing from a right-hand side thereof.
Figure 10E:
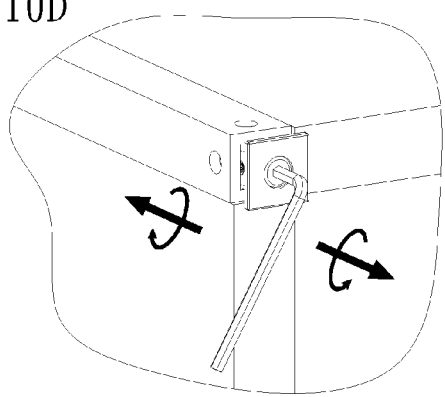
FIG. 10E shows the handling for installing the end plug of FIG. 10A.
Figures 11A, 11B:
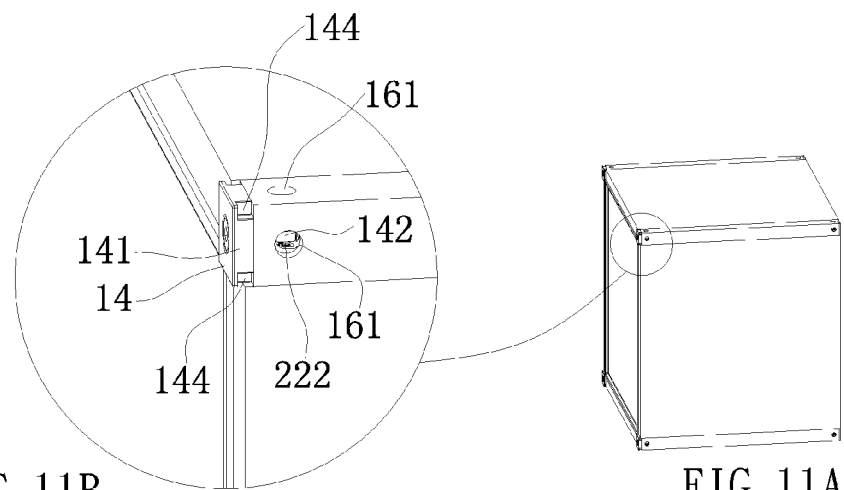
FIG. 11A is a perspective view of a unit (having one storage space) of the furniture assembly in accordance with the present invention.
FIG. 11B is an enlarged view of a circled corner of FIG. 11A.
Figures 11C, 11D:
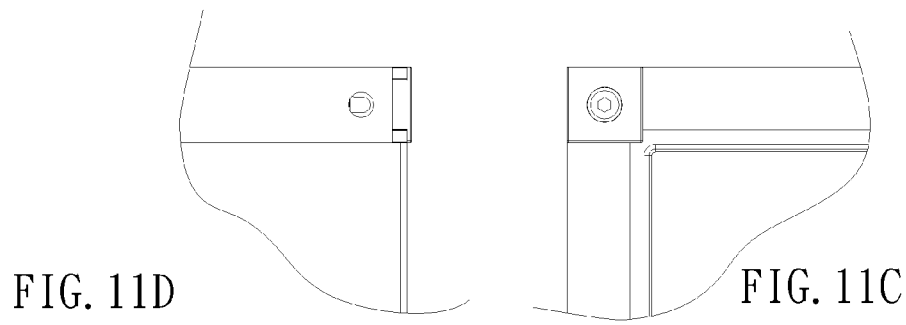
FIG. 11C is a planar view of FIG. 11B.
FIG. 11D is another planar view of FIG. 11B.
Figures 12A, 12B:
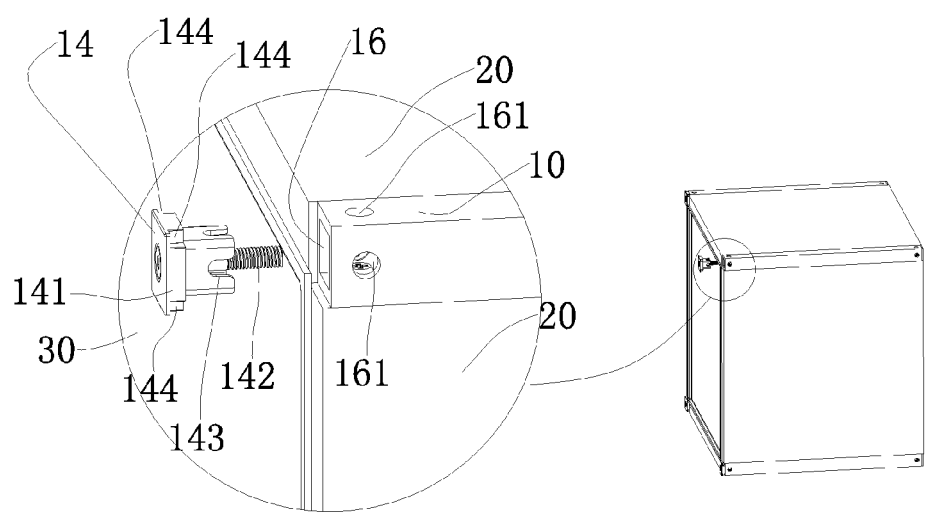
FIG. 12A is another view of FIG. 11A, with the end plug separated.
FIG. 12B is an enlarged view of a circled corner of FIG. 12A.

Referring now to FIG. 2, the division plate 20 of FIG. 1 is shown to have a left lateral surface and a right lateral surface located at opposing ends of one lateral side of the division plate 20 for mounting a front fastener 21 and a rear fastener 22, respectively. Each of the front fastener 21 and the rear fastener 22 has an exposed head portion 212, 222 with a neck groove 211, 221. As shown in FIG. 3 and FIG. 4, the front fastener 21 and the rear fastener 22 are partly buried in the division plate 20, and the buried portion of the fastener 21, 22 has a tapping thread 213、223 and a taper tip. By forcing the front fastener 21 and the rear fastener 22 to screw into the corresponding holes 23 with a predetermined depth on the division plate 20, the front fastener 21 and the rear fastener 22 can be then anchored in positions at the division plate 20.

Further, referring to FIG. 5, FIG. 6A, FIG. 6B and FIG. 7, the squared beam 10 has thereinside a front end plate 11 and a rear end plate 12. Each of the front end plate 11 and the rear end plate 12 has a screw hole 111, 121 located at a center portion thereof. The screw hole 111 of the front end plate 11 is to engage in screwing with a front end plug 13, by which the front end opening of the squared beam 10 can be sealed. Similarly, the screw hole 121 of the rear end plate 12 is to engage in screwing with a rear end plug 14, by which the rear end opening of the squared beam 10 can be sealed. The interior space of the squared beam 10 between the front end opening and the front end plate 11 is defined as a front receiving room 15, and the interior space of the squared beam 10 between the rear end opening and the rear end plate 12 is defined as a rear receiving room 16.

Referring now to FIG. 8, FIG. 9A, FIG. 9B and FIG. 9C, the front receiving room 15 has four sidewalls arranged in a cubic form, and each of the sidewalls has an anchorage hole 151 to allow the head portion of the front fastener 21 at the division plate 20 to penetrate therethrough. Similarly, the rear receiving room 16 also has four sidewalls arranged in a cubic form, and each of the sidewalls has an anchorage hole 161 to allow the head portion of the rear fastener 22 at the division plate 20 to penetrate therethrough.

Further, referring to FIG. 10A through FIG. 10E, the front end plug 13 includes a front cover plate 131 capable of covering the front end opening of the squared beam 10, and a screw 132 to penetrate through the front cover plate 131 and to protrude toward the squared beam 10. Inside the front cover plate 131, four U-shape guides 133 located to individual sides thereof are included. The screw 132 of the front end plug 13 is to screw into the screw hole 111 of the front end plate 11 of the squared beam 10, such that the front end plug 13 can engage with the squared beam 10. While the front cover plate 131 covers or seals the front end opening of the squared beam 10, the four U-shape guides 133 inside the front cover plate 131 are buckled with the respective neck grooves 211 of the individual front fasteners 21 located at different division plates 20.

Also, as shown, the rear end plug 14 includes a rear cover plate 141 capable of covering the rear end opening of the squared beam 10, and a screw 142 to penetrate through the rear cover plate 141 and to protrude toward the squared beam 10. Inside the rear cover plate 141, four U-shape guides 143 located to individual sides thereof are included. The screw 142 of the rear end plug 14 is to screw into the screw hole 121 of the rear end plate 12 of the squared beam 10, such that the rear end plug 14 can engage with the squared beam 10. While the rear cover plate 141 covers or seals the rear end opening of the squared beam 10, the four U-shape guides 143 inside the rear cover plate 141 are buckled with the respective neck grooves 221 of the individual rear fasteners 22 located at different division plates 20. By providing the front end plug 13 and the rear end plug 14 to buckle firmly with the front fastener 21 and the rear fastener 22 respectively of the individual division plate 20, the division plate 20 can then firmly bind to the squared beam 10. In addition, with the U-shape guides 133, 143 inside the respective cover plates 131, 141 of the corresponding end plugs 13, 14 to be made as a unique piece, the strength of the individual U-shape guides 133, 143 is thus substantially enhanced.

As described above, the buckle engagement between the squared beam 10 and the division plate 20 is face-to-face tight, such that the cupboard of the present invention is solid and hard to be twisted.

It is noted that the engagement between the squared beam 10 and the division plate 20 is established in both the front receiving room 15 and the rear receiving room 16, so the middle portion of the squared beam 10 between the front end plate 11 and the rear end plate 12 can have a cross section with structural openings. As shown in FIG. 7, the squared beam 10 can be made up by a plastic injection. The squared beam 10 further includes two insert slots 112 and 122 for sliding in the front end plate 11 and the rear end plate 12, and both of the front end plate 11 and the rear end plate 12 can be metallic. Upon such an arrangement, better engagement strength of the screw 132 of the front end plug 13 with the front end plate 11 can be obtained. Similarly, better engagement strength of the screw 142 of the rear end plug 14 with the rear end plate 12 can be also obtained.

Referring now to FIG. 13A and FIG. 13B, each of the storage spaces 1 can have a back plate 30 to seal the rear opening of the corresponding storage space 1. On the inner surface of the back plate 30, four L-shape positioning brackets 31 are located individually to the four corners thereof. In particular, the back plate 30 and the four L-shape positioning brackets 31 can be made as a unique plastic piece. By providing the four L-shape positioning brackets 31 of the back plate 30 to depress onto the respective inner walls of the storage space 1, the back plate 30 can then be firmly positioned.

Referring now to FIG. 11A through FIG. 11D, FIG. 12A and FIG. 12B, four corner cavities 147 are separately located to four inner corners of the rear cover plate 141 of the rear end plug 14. The aforesaid corners of the back plate 30 are just fitted into the respective corner cavities 147 of the rear cover plate 141 of the rear end plug 14. By providing the four rear cover plates 141 of four rear end plugs 14 to confine the respective corners of the back plate 30, the back plate 30 can thus be firmly fixed in positions. Namely, while the rear end plugs 14 buckle the respective rear fasteners 22 of the corresponding division plates 20, the back plate 30 is also positioned at the corners.

Figure 15:
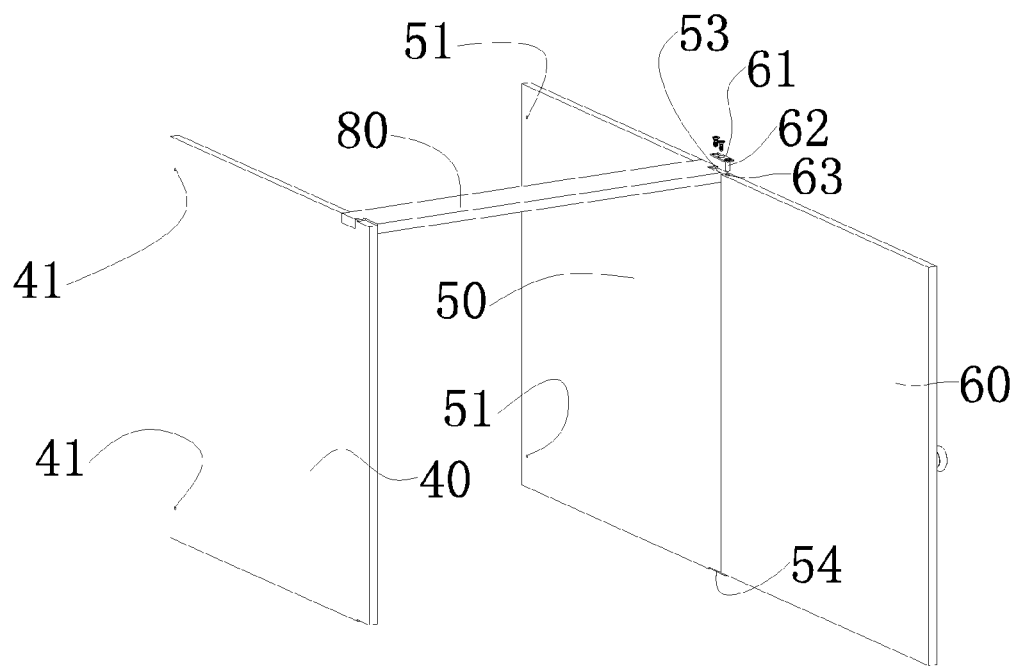
FIG. 15 shows, in an assembled state, the door plate, the spacer bar and two sub-division plates for the furniture assembly in accordance with the present invention.
Figure 16:
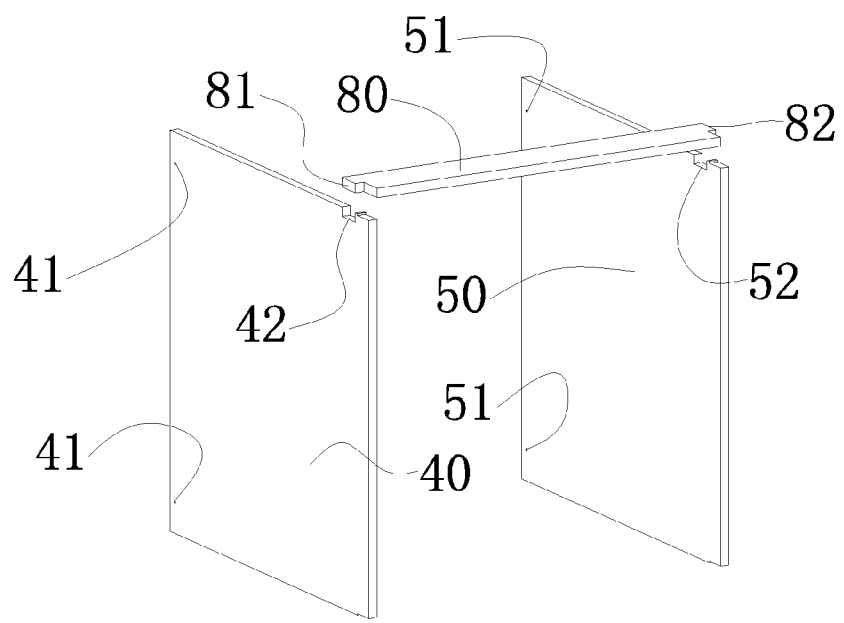
FIG. 16 shows separately the two sub-division plates and the spacer bar of FIG. 15.
Figure 17:
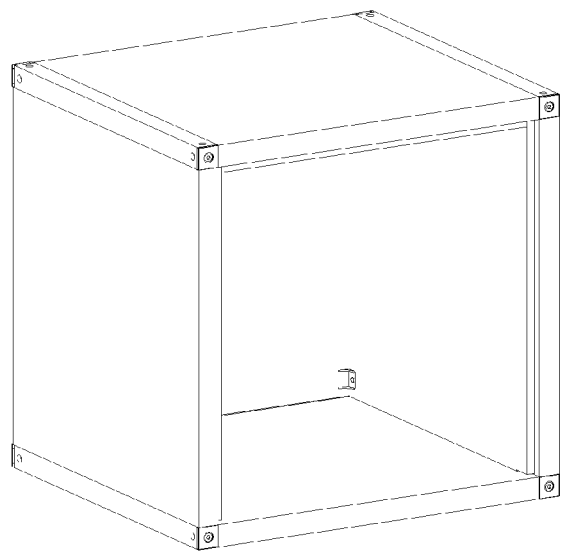
FIG. 17 is a perspective view of a unit of the furniture assembly in accordance with the present invention, with two sub-division plates and one back plate in positions.

Referring now to FIG. 15, FIG. 16 and FIG. 17, the storage space 1 can further have a left sub-division plate 40 and an opposing right sub-division plate 50 to respectively adhere, by a lamination way, to the corresponding left and right division plates 20 forming the storage space 1 so as to build corresponding drawer rails 71 for drawers (FIG. 18A through FIG. 18C) or pivotal parts 61 for door plates 60 (FIG. 15).

Referring to FIG. 13, each of the L-shape positioning brackets 31 on the inside surface of the back plate 30 further includes a protrusion bracket 32 parallel to the division plates 20 located laterally to the storage space 1. A spacing between the protrusion bracket 32 and the neighboring division plate 20 at a left side of the storage space 1 is to provide a room for the left sub-division plate 40 to slide through for a positioning purpose. Similarly, another spacing between the other protrusion bracket 32 and the neighboring division plate 20 at a right side of the storage space 1 is to provide another room for the right sub-division plate 50 to slide through for another positioning purpose. Further, displacements of the left sub-division plate 40 and the right sub-division plate 50 can be then avoided by having the respective positioning pins 33 to penetrate the corresponding anchorage holes 321 on respective individual protrusion brackets 32 and the respective pin holes 41, 51 on the left sub-division plate 40 and the right sub-division plate 50 (FIG. 16), respectively.

As shown in FIG. 16, a spacer bar 80 is further included to space the left sub-division plate 40 from the right sub-division plate 50 by locating across upper front edges of the left sub-division plate 40 and the right sub-division plate 50. Also, at tops of the left sub-division plate 40 and the right sub-division plate 50, cutout dents 42、52 are constructed. The spacer bar 80 has both ends thereof to provide individual end protrusions 81 and 82. The two end protrusions 81 and 82 are to match the respective cutout dents 42 and 52 of the corresponding left division plate 40 and the right division plate 50. The top of the spacer bar 80 is adhered to the division plate 20 located top to the storage space 1, and a front edge of the spacer bar 80 is flush with front edges of the left and right sub-division plates 40, 50 located right and left to the storage space 1. Upon such an arrangement, the left sub-division plate 40 (or the right sub-division plate 50) and the spacer bar 80 can form a stop to the door plate 60 or the drawers 70 (see FIG. 20).

As shown in FIG. 15, the pivotal part 61 for the door plate 60 is installed to the right sub-division plate 50. In another embodiment, the pivotal part 61 for the door plate 60 can also be installed to the left sub-division plate 40. In this embodiment, in the front edge of the right sub-division plate 50, two door-installation holes 53 and 54 for mounting the pivotal parts 61 are located thereof to a top position and a bottom position. Each of the pivotal parts 61 includes a pivotal pin 62 to plug into the corresponding pivotal hole 63, such that the door plate 60 can thus rotate pivotally about the pivotal pins 62.

Figure 18C:
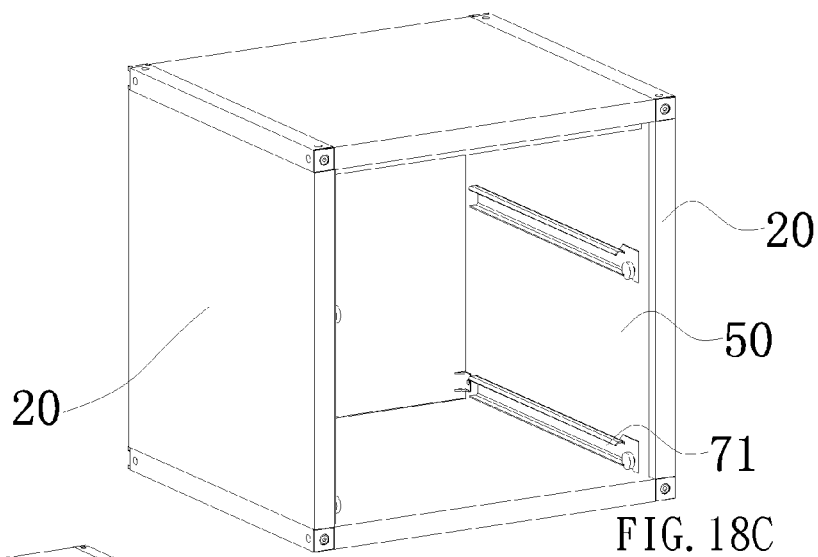
FIG. 18C is a further view of FIG. 18A, with the two drawers removed away.
Figure 18B:
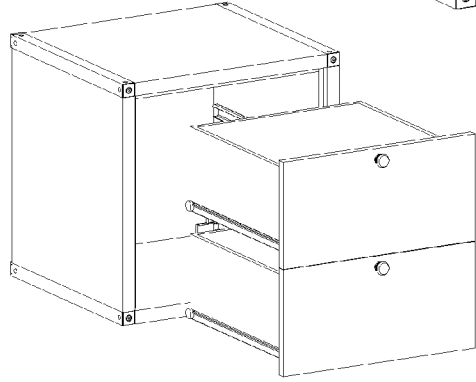
FIG. 18B is another view of FIG. 18A, with the two drawers separated.
Figure 18A:
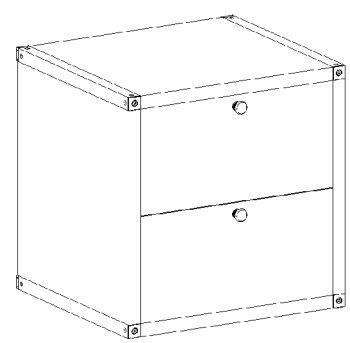
FIG. 18A shows a perspective view of a unit of the furniture assembly in accordance with the present invention, with two drawers in slide-in positions.
Figure 19B:
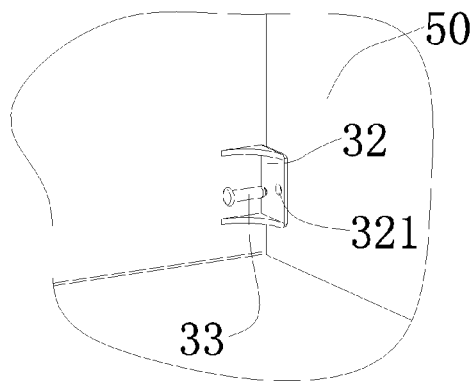
FIG. 19B is another view of FIG. 19A, with the positioning pin separated.
Figure 19A:
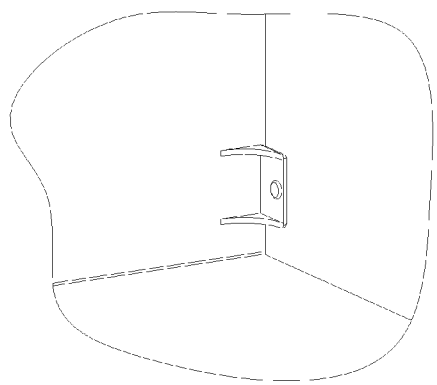
FIG. 19A shows an application of the L-shape positioning bracket for the furniture assembly in accordance with the present invention.
Figure 20:
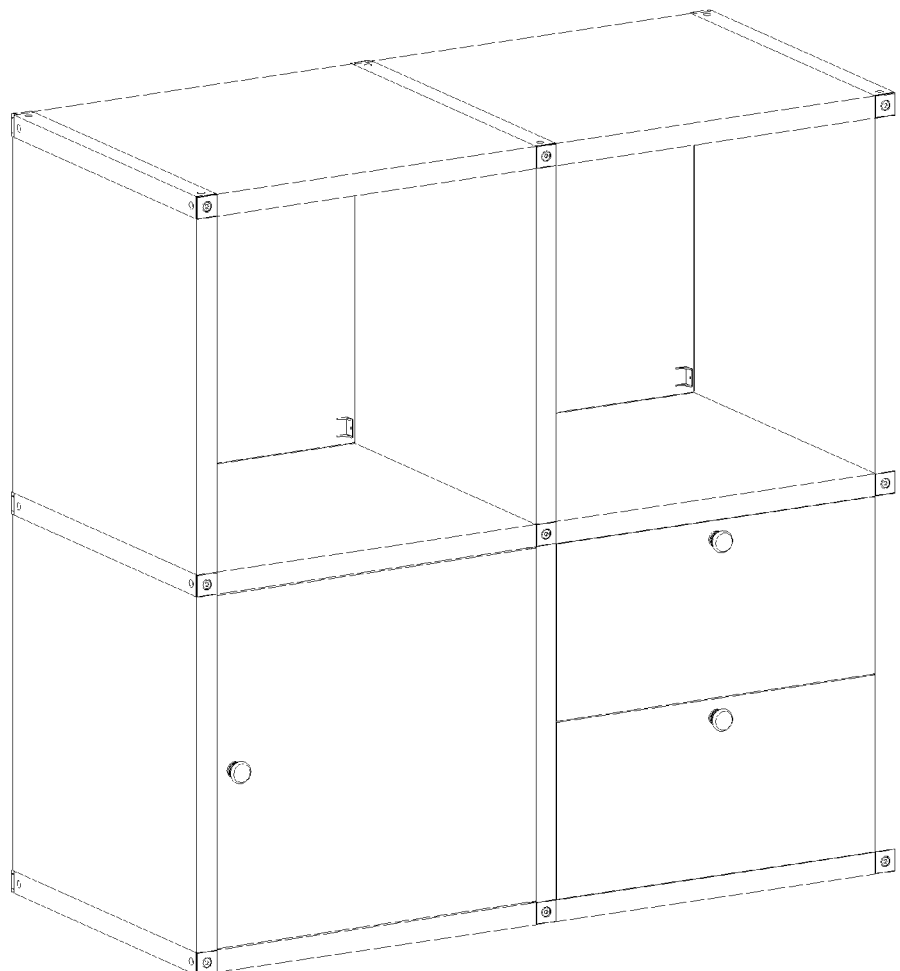
FIG. 20 is a perspective view of another embodiment of the furniture assembly in accordance with the present invention, with two drawers and one door plate.

Referring now to FIG. 18A, FIG. 18B and FIG. 18C, the left sub-division plate 40 and the right sub-division plate 50 can also mount the drawer rails 71 for sliding there-along the corresponding drawers 70 inside the storage space (see FIG. 20).

Figure 21:
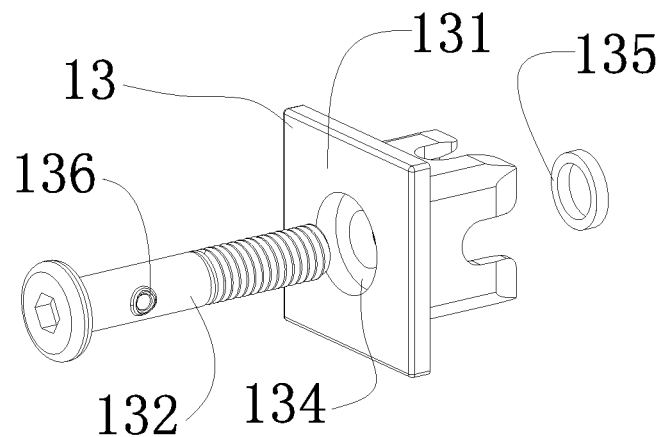
FIG. 21 is an exploded view of the front end plug for the furniture assembly in accordance with the present invention.
Figure 22:
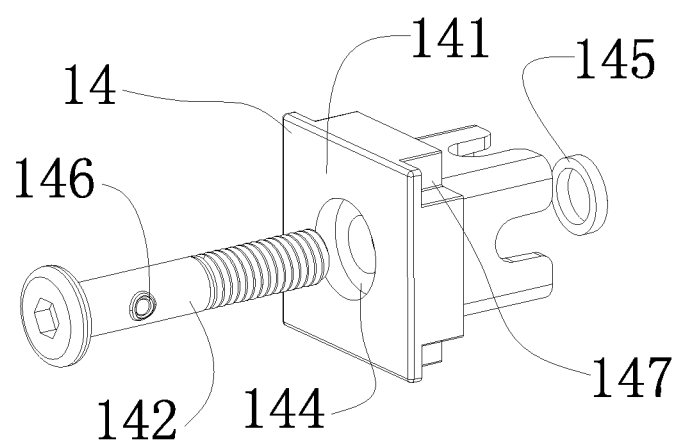
FIG. 22 is an exploded view of the rear end plug for the furniture assembly in accordance with the present invention.

Referring now to FIG. 21 and FIG. 22, the head portion of the screw 132, 142 of each of the front end plug 13 and the rear end plug 14 has a hex socket, and the corresponding hole 134, 144 on the cover plate 131, 141 of the respective each of the front end plug 13 and the rear end plug 14 is a counter sink hole 134, 144, such that the screw 132, 142 penetrating the respective counter sink hole 134, 144 is flush on the head portion. The screws 132, 142 of the front end plug 13 and the rear end plug 14 to penetrate the respective front cover plate 131 and the rear cover plate 141 are individually sleeved by retainer rings 135, 145, in which each of the retainer ring 2 135, 145 has an inner diameter comparable to an outer diameter of the screw 132, 142, and the screw 132, 142 further has at least a position node 136, 146 for anchoring the corresponding retainer ring 135, 145. Upon such an arrangement, the front end plug 13 and the rear end plug 14 can be better locked.

By providing the present invention, the furniture assembly having the squared beams capable of engaging division plates in all four orthogonal directions can thus be solid constructed and built freely to any extendable size.

While the present invention has been particularly shown and described with reference to a preferred embodiment, it will be understood by those skilled in the art that various changes in form and detail may be without departing from the spirit and scope of the present invention.

What is claimed is:

1. A furniture assembly, formed as a cupboard having at least a storage space, comprising:
    four division plates, each of the division plates comprising:
        a left lateral surface;
        a front fastener;
        a right lateral surface; and
        a rear fastener;
        wherein the left lateral surface and the right lateral surface respectively mount the front fastener and the rear fastener, and each of the front fastener and the rear fastener has a corresponding head portion with a neck groove; and
    four squared beams, each of the squared beam comprising:
        a front end plate;
        a rear end plate;
        a rear end plug;
        a front end opening;
        a rear end opening;
        a front receiving room;
        a rear receiving room;
        a front end groove; and
        a rear end groove;
        wherein each of the front end plate and the rear end plate has a screw hole at a center portion thereof, the screw hole of the front end plate engages the front end plug for sealing the front end opening, the screw hole of the rear end plate engages the rear end plug for sealing the rear end opening, the front receiving room is located between the front end opening and the front end plate, the rear receiving room is located between the rear end opening and the rear end plate, the front receiving room further includes four surrounding anchorage holes thereof at an upper wall, a lower wall, a left-side wall and a right-side wall, each of the four surrounding anchorage holes of the front receiving room engages the front fastener of the respective division plate in a penetration way, and the rear receiving room further includes another four surrounding anchorage holes thereof at another upper wall, another lower wall, another left-side wall and another right-side wall, each of the four surrounding anchorage holes of the rear receiving room engages the rear fastener of the respective division plate in a penetration way;
    wherein the front end plug further has thereof a front cover plate to cover the front end opening of the squared beam and a screw to protrude inward from the front cover plate, the front cover plate further has four front lateral U-shape guides, the screw of the front end plug is configured to be screwed into the screw hole of the front end plate which is fixed within the front end groove, and the four front lateral U-shape guide of the front cover plate are buckled into the respective neck groove of the front fastener of the corresponding division plate and the front cover plate seals the front end opening of the squared beam;
    wherein the rear end plug further has thereof a rear cover plate to cover the rear end opening of the squared beam and a screw to protrude inward from the rear cover plate, the rear cover plate further has four rear lateral U-shape guides, the screw of the rear end plug is configured to be screwed into the screw hole of the rear end plate which is fixed within the rear end groove, and the four rear lateral U-shape guide of the rear cover plate are buckled into the respective neck groove of the rear fastener of the corresponding division plate and the rear cover plate seals the rear end opening of the squared beam.

2. The furniture assembly according to claim 1, wherein the storage space is an internal square cubic space formed by four of the at least four division plates and four of the at least four squared beams.

3. The furniture assembly according to claim 2, further including at least a back plate to seal a rear opening of the storage space, wherein the back plate further has four L-shape positioning brackets located interiorly at four corresponding corners thereof for contacting against the respective division plates, the rear end plug has a rear cover plate further having symmetrically four rear corner cavities for matching corresponding corners of the back plate, and the back plate is firmly established to seal the storage space by having the rear cover plate to position the corresponding corner of the back plate.

4. The furniture assembly according to claim 3, wherein the back plate and the L-shape positioning brackets are connected together.

5. The furniture assembly according to claim 3, wherein the storage space further has a left sub-division plate and an opposing right sub-division plate to respectively adhere to the corresponding division plates forming the storage space so as to build one of corresponding drawer rails for a drawer and pivotal parts for a door plate.

6. The furniture assembly according to claim 5, further comprises a door plate, wherein the door plate has two pivotal parts selectively fixed individually to a top and a bottom of the left sub-division plate or the right sub-division plate, and each of the two pivotal parts has a pivotal pin for plugging into a corresponding pin hole of the door plate.

7. The furniture assembly according to claim 4, wherein each of the L-shape positioning brackets on the inside surface of the back plate further includes a protrusion bracket parallel to the division plates located laterally to the storage space, a spacing between the protrusion bracket and the division plate at a left side of the storage space is to provide a room for the left sub-division plate to slide through for a positioning purpose, another spacing between the other protrusion bracket and the division plate at a right side of the storage space is to provide another room for the right sub-division plate to slide through for another positioning purpose, and displacements of the left sub-division plate and the right sub-division plate are avoided by having respective positioning pins to penetrate the corresponding anchorage holes on respective individual protrusion brackets and respective pin holes on the left sub-division plate and the right sub-division plate, respectively.

8. The furniture assembly according to claim 6, wherein a spacer bar is further included to space the left sub-division plate from the right sub-division plate by locating across upper front edges of the left sub-division plate and the right sub-division plate.

9. The furniture assembly according to claim 8, wherein tops of the left sub-division plate and the right sub-division plate further have individual cutout dents, both ends of the spacer bar further have respective individual end protrusions, and the end protrusions engage with the respective cutout dents.

10. The furniture assembly according to claim 8, wherein top of the spacer bar is adhered to the division plate located top to the storage space, and a front edge of the spacer bar is flush with front edges of the right and left sub-division plates located right and left to the storage space.

11. The furniture assembly according to claim 1, wherein a portion of the squared beam between the front end plate and the rear end plate has a cross section with openings.

12. The furniture assembly according to claim 1, wherein the squared beam is made up by a plastic injection, the squared beam further includes two insert slots for sliding in the front end plate and the rear end plate, and both of the front end plate and the rear end plate are metallic.

13. The furniture assembly according to claim 1, wherein the head portion of the screw of each of the front end plug and the rear end plug has a hex socket, and the corresponding hole on the cover plate of the respective each of the front end plug and the rear end plug is a counter sink hole, such that the screw penetrating the respective counter sink hole is flush on the head portion.

14. The furniture assembly according to claim 13, wherein the screw of each of the front end plug and the rear end plug is further sleeved by a retainer ring having an inner diameter comparable to an outer diameter of the screw, and the screw further has at least a position node for anchoring the retainer ring.

15. The furniture assembly according to claim 1, wherein a portion of each of the front fastener and the rear fastener buried into the division plate is a portion having a tapping thread and a taper tip, the each of the front fastener and the rear fastener is fixed firmly to the division plate by tapping the portion into a respectively hole on the division plate.

* * * * *